US011951345B2

(12) United States Patent
Monfils et al.

(10) Patent No.: US 11,951,345 B2
(45) Date of Patent: *Apr. 9, 2024

(54) FIREFIGHTING FOAM COMPOSITION

(71) Applicant: Tyco Fire Products LP, Cranston, RI (US)

(72) Inventors: JoAnna M. Monfils, Peshtigo, WI (US); John P. Libal, Peshtigo, WI (US); Blake H. Bomann, Greenville, WI (US)

(73) Assignee: Tyco Fire Products LP, Cranston, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/307,712

(22) Filed: Apr. 26, 2023

(65) Prior Publication Data

US 2023/0256281 A1 Aug. 17, 2023

Related U.S. Application Data

(63) Continuation of application No. 17/723,019, filed on Apr. 18, 2022, now Pat. No. 11,673,011, which is a continuation-in-part of application No. 17/694,665, filed on Mar. 14, 2022.

(60) Provisional application No. 63/297,384, filed on Jan. 7, 2022, provisional application No. 63/288,026, filed on Dec. 10, 2021, provisional application No. 63/288,024, filed on Dec. 10, 2021, provisional application No. 63/288,020, filed on Dec. 10, 2021, provisional application No. 63/245,028, filed on Sep. 16, 2021, provisional application No. 63/215,006, filed on Jun. 25, 2021, provisional application No. 63/188,633, filed on May 14, 2021.

(51) Int. Cl.
*A62D 1/02* (2006.01)
*A62C 99/00* (2010.01)
*A62D 1/00* (2006.01)

(52) U.S. Cl.
CPC ........ *A62D 1/0071* (2013.01); *A62C 99/0036* (2013.01)

(58) Field of Classification Search
None
See application file for complete search history.

(56) References Cited

U.S. PATENT DOCUMENTS

| | | | |
|---|---|---|---|
| 3,956,138 | A | 5/1976 | Crockett |
| 4,060,489 | A | 11/1977 | Chiesa, Jr. |
| 4,398,605 | A | 8/1983 | Conklin et al. |
| 4,410,508 | A | 10/1983 | Brown et al. |
| 5,218,021 | A | 6/1993 | Clark et al. |
| 5,225,095 | A | 7/1993 | Dimaio et al. |
| 5,296,164 | A | 3/1994 | Thach et al. |
| 5,391,721 | A | 2/1995 | Hanen et al. |
| 5,434,192 | A | 7/1995 | Thach et al. |
| 5,496,475 | A | 3/1996 | Jho et al. |
| 5,616,273 | A | 4/1997 | Clark et al. |
| 5,706,895 | A | 1/1998 | Sydansk |
| 5,882,541 | A | 3/1999 | Achtmann |
| 5,997,758 | A | 12/1999 | Barbarin et al. |
| 6,262,128 | B1 | 7/2001 | Stern et al. |
| 6,599,872 | B1 | 7/2003 | Hubert et al. |
| 7,005,082 | B2 | 2/2006 | Clark |
| 7,011,763 | B2 | 3/2006 | Clark |
| 7,135,125 | B2 | 11/2006 | Clark |
| 7,172,709 | B2 | 2/2007 | Clark |
| 7,199,083 | B2 | 4/2007 | Zevallos |
| 7,271,133 | B2 | 9/2007 | Weaver et al. |
| 7,334,640 | B2 | 2/2008 | Hanes et al. |
| 7,381,696 | B2 | 6/2008 | Hubert et al. |
| 7,541,316 | B2 | 6/2009 | Maresh |
| 7,569,155 | B2 | 8/2009 | Schaefer |
| 7,588,645 | B2 | 9/2009 | Griese et al. |
| 7,888,297 | B2 | 2/2011 | Hanes et al. |
| 7,888,308 | B2 | 2/2011 | Swazey |
| 7,994,111 | B2 | 8/2011 | Caggioni et al. |
| 8,043,999 | B2 | 10/2011 | Sullivan et al. |
| 8,076,270 | B2 | 12/2011 | Smith et al. |
| 8,207,094 | B2 | 6/2012 | Hutchins et al. |
| 8,298,436 | B2 | 10/2012 | Michael |
| 8,366,955 | B2 | 2/2013 | Thomas et al. |
| 8,413,721 | B2 | 4/2013 | Welton et al. |

(Continued)

FOREIGN PATENT DOCUMENTS

| | | | |
|---|---|---|---|
| CN | 1599633 | A | 3/2005 |
| CN | 101198381 | A | 6/2008 |

(Continued)

OTHER PUBLICATIONS

Derwent-Acc-No. 2020-69248T as Abstract for WO 2020149733 A1 (Jul. 2020). (Year: 2020).*
CN 112694638 A (English Language Abstract). (Year: 2021).*
Derwent Acc. No. 2020-69248T; Chai, et al; "Composition with Foaming Properties"; Derwent; Abstract for WO2020/149733A1; dated Jul. 23, 2020; 4 pages.
International Search Report and Written Opinion on PCT Appl. Ser. No. PCT/IB2022/053615 dated Jul. 26, 2022 (13 pages).
International Search Report and Written Opinion on PCT Appl. Ser. No. PCT/IB2022/053618 dated Jul. 22, 2022 (13 pages).

(Continued)

*Primary Examiner* — Joseph D Anthony
(74) *Attorney, Agent, or Firm* — Foley & Lardner LLP

(57) ABSTRACT

A method of fighting a fire includes aerating a firefighting foam composition to form an aerated firefighting foam; administering the aerated firefighting foam to a fire or applying the aerated firefighting foam to a surface of a volatile flammable liquid; wherein: the firefighting foam composition includes a sugar component; a surfactant component comprising an anionic surfactant, a zwitterionic surfactant, or a mixture of any two or more thereof; a polysaccharide thickener comprising succinoglycan; and at least about 30 wt. % water.

17 Claims, No Drawings

(56) References Cited

U.S. PATENT DOCUMENTS

| | | | | |
|---|---|---|---|---|
| 8,524,104 | B1 | 9/2013 | Michael | |
| 8,703,691 | B2 | 4/2014 | Caggioni et al. | |
| 8,772,359 | B2 | 7/2014 | Swazey | |
| 8,783,374 | B2 | 7/2014 | Rains et al. | |
| 9,045,716 | B2 | 6/2015 | Swazey et al. | |
| 9,259,602 | B2 | 2/2016 | Robinet et al. | |
| 9,289,636 | B2 | 3/2016 | Mathis | |
| 9,420,784 | B2 | 8/2016 | Vanlaer et al. | |
| 9,487,661 | B2 | 11/2016 | Johnson et al. | |
| 9,662,522 | B2 | 5/2017 | Liu et al. | |
| 9,669,246 | B2 | 6/2017 | Bowen et al. | |
| 9,675,828 | B1 | 6/2017 | Sery | |
| 9,687,686 | B2 | 6/2017 | Blunk et al. | |
| 9,776,029 | B2 | 10/2017 | Izumida et al. | |
| 9,956,447 | B2 | 5/2018 | Martin et al. | |
| 9,956,448 | B2 | 5/2018 | Martin | |
| 10,030,214 | B2 | 7/2018 | Swazey et al. | |
| 10,071,273 | B2 | 9/2018 | Hansen et al. | |
| 10,159,863 | B2 | 12/2018 | Mariampillai et al. | |
| 10,173,089 | B2 | 1/2019 | Xie | |
| 10,214,708 | B2 | 2/2019 | Swazey et al. | |
| 10,328,297 | B2 | 6/2019 | Bowen et al. | |
| 10,335,624 | B2 | 7/2019 | Libal | |
| 10,369,394 | B2 | 8/2019 | Bowen | |
| 10,369,395 | B2 | 8/2019 | Bowen et al. | |
| 10,443,019 | B2 | 10/2019 | Fossum et al. | |
| 10,457,900 | B2 | 10/2019 | Fossum et al. | |
| 10,494,592 | B2 | 12/2019 | Applegate et al. | |
| 10,518,120 | B2 | 12/2019 | Pai et al. | |
| 10,625,108 | B2 | 4/2020 | Mariampillai et al. | |
| 10,653,910 | B2 | 5/2020 | Da Costa et al. | |
| 10,780,305 | B2 | 9/2020 | Xie et al. | |
| 10,870,030 | B2 | 12/2020 | Libal | |
| 10,940,352 | B2 | 3/2021 | Worsman | |
| 11,065,490 | B2 | 7/2021 | Lavergne et al. | |
| 11,173,334 | B2 | 11/2021 | Xie et al. | |
| 11,771,939 | B2 * | 10/2023 | Monfils ................ | A62D 1/0042 252/3 |
| 2002/0014610 | A1 * | 2/2002 | Tanaka ................. | A62D 1/0071 252/3 |
| 2003/0201419 | A1 * | 10/2003 | Tanaka ................. | A62D 1/0057 252/3 |
| 2004/0006175 | A1 | 1/2004 | Diener et al. | |
| 2005/0113272 | A1 | 5/2005 | Yeung et al. | |
| 2007/0256836 | A1 | 11/2007 | Welton et al. | |
| 2008/0108541 | A1 | 5/2008 | Swazey | |
| 2008/0196908 | A1 | 8/2008 | Schaefer | |
| 2011/0097294 | A1 | 4/2011 | Anthony et al. | |
| 2013/0313465 | A1 | 11/2013 | Podella et al. | |
| 2014/0138104 | A1 | 5/2014 | Robinet et al. | |
| 2016/0107015 | A1 | 4/2016 | Cheng | |
| 2017/0056698 | A1 * | 3/2017 | Pai ....................... | A62D 1/0042 |
| 2017/0259099 | A1 | 9/2017 | Blunk et al. | |
| 2018/0325141 | A1 * | 11/2018 | Nakajima .............. | A21D 13/50 |
| 2018/0361185 | A1 | 12/2018 | Siem | |
| 2019/0008187 | A1 | 1/2019 | Konda et al. | |
| 2019/0262647 | A1 * | 8/2019 | Havelka-Rivard .. | A62D 1/0071 |
| 2019/0314660 | A1 | 10/2019 | Chirac et al. | |
| 2020/0094093 | A1 | 3/2020 | Worsman et al. | |
| 2020/0101340 | A1 | 4/2020 | Worsman | |
| 2020/0139180 | A1 | 5/2020 | Lovas | |
| 2020/0206552 | A1 | 7/2020 | Mariampillai et al. | |
| 2020/0215372 | A1 | 7/2020 | Lavergne et al. | |
| 2020/0368570 | A1 | 11/2020 | Hodgen et al. | |
| 2021/0009787 | A1 | 1/2021 | Hulbert et al. | |
| 2021/0046347 | A1 * | 2/2021 | LaVergne ................. | A62C 5/02 |
| 2021/0128431 | A1 | 5/2021 | Sartingen et al. | |
| 2021/0146182 | A1 | 5/2021 | Hugener | |
| 2021/0154512 | A1 | 5/2021 | Libal | |
| 2021/0187337 | A1 | 6/2021 | Worsman | |
| 2021/0283449 | A1 | 9/2021 | Lavergne et al. | |
| 2022/0134158 | A1 | 5/2022 | Havelka-Rivard et al. | |
| 2022/0411644 | A1 | 12/2022 | Rhoades et al. | |
| 2023/0256281 | A1 * | 8/2023 | Monfils .............. | A62C 99/0036 252/3 |

FOREIGN PATENT DOCUMENTS

| | | | | | |
|---|---|---|---|---|---|
| CN | 105056458 | A | 11/2015 | | |
| CN | 112675469 | A | 4/2021 | | |
| MY | WO 2020149733 | A1 * | 7/2020 | ............. C09K 8/594 | |
| WO | WO-2008/058324 | A1 | 5/2008 | | |
| WO | WO-2011/050980 | A2 | 5/2011 | | |
| WO | WO-2016/075480 | A1 | 5/2016 | | |
| WO | WO-2016/082041 | A1 | 6/2016 | | |
| WO | WO-2018/022763 | A1 | 2/2018 | | |
| WO | WO-2018/134393 | A1 | 7/2018 | | |
| WO | WO-2018/234647 | A1 | 12/2018 | | |
| WO | WO-2019/202045 | A1 | 10/2019 | | |
| WO | WO-2020/033255 | A1 | 2/2020 | | |
| WO | WO-2020/084277 | A1 | 4/2020 | | |
| WO | WO-2020/109654 | A1 | 6/2020 | | |
| WO | WO-2020/144579 | A1 | 7/2020 | | |
| WO | WO-2020/149733 | A1 | 7/2020 | | |
| WO | WO-2020/217126 | A1 | 10/2020 | | |
| WO | WO-2020/247780 | A1 | 12/2020 | | |
| WO | WO-2021/099308 | A1 | 5/2021 | | |
| WO | WO-2022/094399 | | 5/2022 | | |

OTHER PUBLICATIONS

International Search Report and Written Opinion on PCT Appl. Ser. No. PCT/IB2022/053619 dated Jul. 29, 2022 (14 pages).

International Search Report and Written Opinion on PCT Appl. Ser. No. PCT/IB2022/053620 dated Jul. 29, 2022 (14 pages).

International Search Report and Written Opinion on PCT Appl. Ser. No. PCT/IB2022/053621 dated Jul. 29, 2022 (15 pages).

* cited by examiner

FIREFIGHTING FOAM COMPOSITION

CROSS-REFERENCE TO RELATED APPLICATIONS

This application is a continuation of U.S. patent application Ser. No. 17/723,019, filed on Apr. 18, 2022, which is a continuation-in-part of U.S. patent application Ser. No. 17/694,665, filed on Mar. 14, 2022, which claims the benefit of priority to U.S. Provisional Patent Application Nos. 63/188,633, filed on May 14, 2021; 63/215,006, filed on Jun. 25, 2021; 63/245,028, filed Sep. 16, 2021; 63/288,024, filed on Dec. 10, 2021; 63/288,020, filed on Dec. 10, 2021; and 63/288,026, filed on Dec. 10, 2021. U.S. patent application Ser. No. 17/723,019 claims the benefit of priority to U.S. Provisional Patent Application No. 63/297,384, filed on Jan. 7, 2022. The contents of all of the above applications are incorporated herein by reference in their entirety.

BACKGROUND

Firefighting foams are often able to fight Class A and Class B fires. Class A fires are those involving combustible material such as paper, wood, etc. and can be fought by quenching and cooling with large quantities of water or solutions containing water. Class B fires are those involving flammable liquid fuels, gasoline, and other hydrocarbons. Due to the liquid nature of the fuel involved, Class B fires are difficult to extinguish. Most flammable liquids exhibit high vapor pressure along with low fire and flash points. This typically results in a wide flammability range. In this type of fire, the use of water as the sole firefighting agent is generally ineffective because the only means of fighting fire with water is through cooling.

Conventional foam-forming firefighting compositions commonly include fluorinated surfactants. There is a strong desire in the marketplace to replace these fluorinated firefighting products with non-fluorinated products. There is therefore a continuing need to produce non-fluorinated firefighting compositions, also known as synthetic fluorine-free foams or SFFF that can be deployed to fight Class A and Class B fires.

SUMMARY

The present application is directed to aqueous foam compositions, typically in concentrate form, which can be diluted with an aqueous diluent to provide a foam precursor composition. The foam precursor composition may subsequently be aerated to provide a firefighting foam. The aqueous firefighting compositions include a sugar component; a surfactant component containing one or more of an anionic surfactant, a zwitterionic surfactant, and optionally a nonionic surfactant; and a polysaccharide thickener including succinoglycan. The aqueous firefighting compositions may also include an organic solvent, e.g., a water-miscible organic solvent such as an alkylene glycol, glycerol, a water-soluble polyethylene glycol and/or a glycol ether, and may also contain an aliphatic alcohol-based component. The concentrate may also contain additional polysaccharide thickeners, such as a natural gum. The composition may desirably be substantially free of any fluorinated surfactant (s), e.g., contain no more than 0.01 wt. % fluorinated surfactant(s) and, often, is completely free of any fluorinated surfactant or other fluorinated compound. In some embodiments, the composition is free of nonionic surfactant(s).

An illustrative embodiment provides an aqueous firefighting foam composition including a sugar component; a surfactant component which includes one or more of an anionic surfactant, a zwitterionic surfactant, and optionally a nonionic surfactant; a polysaccharide thickener which includes succinoglycan; and at least about 30% water. In some embodiments, the firefighting composition also includes one or more of an alkanolamine, a glycol solvent, a glycol ether solvent, an aliphatic alcohol-based component, and a magnesium salt. In some embodiments, at least 50 wt. % of the sugar component is a monosaccharide and/or sugar alcohol. In some instances, the composition may also include one or more other polysaccharide thickeners. In some embodiments, the composition is free of nonionic surfactant(s).

Another illustrative embodiment provides an aqueous firefighting foam composition including a sugar component; a polysaccharide thickener which includes succinoglycan; an anionic surfactant; optionally a nonionic surfactant; a water-miscible solvent; magnesium salt; and at least about 30% water. The composition generally contains no more than 0.01 wt. % fluorinated surfactant and, often, is completely free of any fluorinated surfactant or other fluorinated compound(s). The composition may be substantially free of any fluorinated compound, e.g., contain no more than 0.01 wt. % fluorinated surfactant(s) and, often, is completely free of any fluorinated surfactant or other fluorinated compound (s). As used herein, the phrase "substantially free of fluorine" means that the composition has a total concentration of fluorine atoms on a weight percentage basis of no more than about 70 parts per trillion (ppt) F. The aqueous firefighting foam compositions of the present disclosure may include substantially less than 70 ppt F. In some embodiments, the composition also includes a zwitterionic surfactant. In some embodiments, the composition is free of nonionic surfactant (s).

In some embodiments, the aqueous firefighting foam composition includes about 5 to 25 wt. % of a sugar component, about 0.1 to 5 wt. % of an aliphatic alcohol-based nonionic surfactant, about 2 to 15 wt. % of the anionic surfactant, about 2 to 10 wt. % of the zwitterionic surfactant, about 2 to 15 wt. % of water-miscible organic solvent, about 1 to 5 wt. % polysaccharide thickener, which includes succinoglycan, and at least about 40 wt. % water. In this embodiment, the composition generally contains no more than 0.01 wt. % fluorinated surfactant and, often, is completely free of any fluorinated surfactant or other fluorinated compound. The composition may desirably be substantially free of any fluorinated compound, e.g., contain no more than 0.01 wt. % fluorinated surfactant(s) and, often, is completely free of any fluorinated surfactant or other fluorinated compound.

In another embodiment, the aqueous firefighting foam composition includes about 5 to 20 wt. % monosaccharide sugar, about 3 to 10 wt. % $C_{8-14}$-alkyl sulfate anionic surfactant, about 2 to 8 wt. % $C_{8-14}$-alkylamidopropyl hydroxysultaine, about 0.2 to 2 wt. % $C_{8-14}$-aliphatic alcohol, about 0.5 to 4 wt. % succinoglycan, about 0.2 to 1.5 wt. % xanthan gum, about 2 to 10 wt. % butyl carbitol, and at least about 40 wt. % water. In this embodiment, the composition generally contains no more than 0.01 wt. % fluorinated surfactant and, often, is completely free of any fluorinated surfactant or other fluorinated compound. The composition may desirably be substantially free of any fluorinated compound, e.g., contain no more than 0.01 wt. % fluorinated surfactant(s) and, often, is completely free of any fluorinated surfactant or other fluorinated compound. In some embodiments, the composition is free of nonionic surfactant(s).

Another illustrative embodiment provides an aqueous firefighting foam composition including a surfactant component comprising one or more of an anionic surfactant, a zwitterionic surfactant, and, optionally, a nonionic surfactant; an $C_{8-14}$-aliphatic alcohol-based component; polysaccharide thickener comprising succinoglycan; and at least about 40 wt. % water. In some embodiments, the composition also includes a water-miscible organic solvent such as an alkylene glycol and/or alkylene glycol ether. In some embodiments, the composition is free of nonionic surfactant (s).

Any of the above embodiments may optionally include other compounds to enhance performance of the composition. For example, in any of the above disclosed embodiments, the composition may include one or more of a chelator, a buffer, a corrosion inhibitor and a preservative. In any of the above embodiments, the composition may have a pH of about 7 to 9. In any of the above embodiments, the composition may be substantially free of cationic surfactants. In any of the above embodiments, the composition may be substantially free of any alkyl polyglycoside surfactant. In any of the above embodiments, the composition may be substantially free of any amine oxide surfactant. In any of the above embodiments, the composition may be substantially free of fluorinated compounds.

Another illustrative embodiment provides an aqueous firefighting foam composition including a) about 5 to 10 wt. % $C_{8-18}$-alkyl sulfate surfactant, b) about 2 to 8 wt. % $C_{8-18}$-alkylamidopropyl hydroxysultaine; c) about 0.1 to 2 wt. % $C_{8-14}$-aliphatic alcohol-based component, d) about 2 to 10 wt. % water-miscible organic solvent comprising an alkylene glycol and/or alkylene glycol ether, e) about 1 to 4 wt. % polysaccharide thickener including succinoglycan, and f) at least about 50 wt. % water. The aliphatic alcohol-based component may includes at least two alcohols and/or alcohol ethoxylates. For example, the composition may include two or more alcohol-based compounds, such as aliphatic alcohols and/or ethoxylates of aliphatic alcohols. In compositions including aliphatic alcohol ethoxylates, the ethoxylates may have an average of no more than about 6 and, or no more than about 4 ethylene oxide units, or often no more than about 2 ethylene oxide units. The composition may desirably be substantially free of any fluorinated compound, e.g., contain no more than 0.01 wt. % fluorinated surfactant(s) and, often, is completely free of any fluorinated surfactant or other fluorinated compound.

Another illustrative embodiment provides an aqueous firefighting foam composition including a) about 5 to 10 wt. % of one or more of an octyl sulfate salt, a decyl sulfate salt and a lauryl sulfate salt, b) about 2 to 8 wt. % $C_{8-18}$-alkylamidopropyl hydroxysultaine, c) about 0.1 to 2 wt. % octyl alcohol, lauryl alcohol, or a combination of octyl alcohol and lauryl alcohol, about 2 to 10 wt. % butyl carbitol, about 1 to 4 wt. % xanthan gum and succinoglycan, about 0.5 to 3 wt. % magnesium sulfate, and g) at least about 50 wt. % water. The composition may desirably be substantially free of any fluorinated compound, e.g., contain no more than 0.01 wt. % fluorinated surfactant(s) and, often, is completely free of any fluorinated surfactant or other fluorinated compound.

Another illustrative embodiment provides a method of fighting a fire, including forming a foam from a composition that includes at least one of the aqueous firefighting foam compositions previously disclosed herein, and applying the foam directly or indirectly onto the fire. Such a method may be employed to fight a class A or class B fire.

Another illustrative embodiment provides a method of forming a firefighting foam including diluting the composition of any one of the aqueous firefighting foam compositions previously disclosed herein with an aqueous diluting agent to provide a foam precursor solution, and aerating the foam precursor solution to provide the firefighting foam. The aqueous diluting agent may include one or more of municipal water, brackish water and salt water.

In a further aspect, a firefighting foam concentrate may include a sugar component; a surfactant component containing one or more of an anionic surfactant, a zwitterionic surfactant, and optionally a nonionic surfactant; a polysaccharide thickener including succinoglycan; and a microfibrous cellulose. In such cases, the inclusion of a microfibrous cellulose suspension agent may aid in stabilizing the resulting dispersion. The concentrates may be substantially free of any fluorinated compound(s), e.g., contain no more than 0.01 wt. % fluorinated surfactant(s)/fluorinated compound(s) and, often, is completely free of any fluorinated surfactant or other fluorinated compound. In some embodiments, the concentrates and/or compositions are free of nonionic surfactants.

In a further aspect, a method of fighting a fire includes aerating a firefighting foam composition to form an aerated firefighting foam; and administering the aerated firefighting foam to a fire or applying the aerated firefighting foam to a surface of a volatile flammable liquid. The firefighting foams for use in the method include any firefighting foam compositions or concentrates as described herein.

DETAILED DESCRIPTION

The aqueous firefighting foam compositions include a sugar component and a surfactant component containing one or more of an anionic surfactant, a zwitterionic surfactant, and, optionally, a nonionic surfactant, and a polysaccharide thickener including succinoglycan. The aqueous firefighting composition may also include an organic solvent, e.g., a water-miscible organic solvent, a sulfate salt, and additional polysaccharide thickeners. The composition may desirably be substantially free of any fluorinated surfactants or compounds. The composition may desirably contain less than 70 ppt F.

In one aspect, the aqueous firefighting foam composition includes a sugar component. The sugars for use in the aqueous fire-fighting foam concentrates are generally simple monosaccharide sugars or polysaccharide sugars, and may include other carbohydrates, such as common sugar (sucrose/dextrose) derived from sugar cane or sugar beets. Sucrose is a disaccharide composed from the basic, simple sugar molecules glucose and fructose. Mixtures where the majority of the sucrose has been broken down into its monosaccharide components, glucose and fructose (e.g., invert sugar), are quite suitable for use in the present concentrates. Sucrose is readily available in view of its world production from cane and sugar beet on the order of millions of tons per annum. Those skilled in the art will also be aware that other commercially available simple monosaccharides and related sugar alcohols can be utilized in the present foam concentrates. Examples of suitable monosaccharides for use in the present foam concentrates include one or more of glucose, fructose, mannose, xylose and galactose. Examples of suitable sugar alcohols for use in the present foam concentrates include one or more of a four carbon sugar alcohol, such as erythritol, a five carbon alditol, such as xylitol, a six carbon alditol, such as mannitol and/or sorbitol, and other sugar alcohols, such as isomalt. The sugar alcohol may be derived from a monosaccharide.

The aqueous fire-fighting foam concentrates generally include a sugar component comprising at least about 50 wt. % of one or more monosaccharide sugars and/or sugar alcohols. Illustrative sugar components include, but are not limited to, one or more of glucose, fructose, mannose, xylose, sorbitol, xylitol, and mannitol. The foam concentrate may include about 5 to 25 wt. %, or about 10 to 20 wt. % of the sugar component. In some instances, the foam concentrate may include as much as about 45 wt. % or even 50 wt. % of the sugar component. In some embodiments, the sugar component is made up of at least about 75 wt. %, at least about 80 wt. %, or even at least about 90 wt. % monosaccharide sugar and/or sugar alcohol. For example, the sugar component may be made up of at least about 50 wt. %, at least about 75 wt. %, at least about 80 wt. %, or even at least about 90 wt. % of one or more of glucose, fructose, mannose, xylitol, sorbitol, and mannitol. In some embodiments, the foam concentrate may include a sugar component, which is made up of at least about 50 wt. % of one or more sugar alcohols, such as xylitol, sorbitol, and mannitol. Advantageously, the sugar component may include at least about 50 wt. %, at least about 75 wt. %, at least about 80 wt. %, or even at least about 90 wt. % of one or more of glucose, fructose, and sorbitol. For example, the sugar component may include at least about 50 wt. %, or at least about 75 wt. % glucose and/or fructose.

The aqueous firefighting foam compositions may include an anionic surfactant. The anionic surfactant may suitably include an alkyl sulfate surfactant, an alkyl sulfonate surfactant, alkyl ether sulfate surfactant and/or an alkyl ether sulfonate surfactant. The anionic surfactant may includes an alkyl sulfate surfactant and/or an alkyl sulfonate surfactant. The alkyl sulfate salt surfactant may includes include a $C_{8-12}$-alkyl sulfate salt. Suitable examples of the $C_{8-12}$-alkyl sulfate salt include a dodecyl sulfate salt, a decyl sulfate salt, an octyl sulfate salt, or a combination of any two or more thereof. In some embodiments, the alkyl sulfate salt includes an alkyl sulfate sodium salt, such as a sodium decyl sulfate, sodium octyl sulfate, or a combination thereof. In some embodiments, the alkyl sulfate salt includes an alkyl sulfate ammonium salt, such as an ammonium decyl sulfate, ammonium octyl sulfate, ammonium lauryl sulfate, or a combination thereof. One suitable example is the triethanolamine salt of lauryl sulfate. In embodiments that include the anionic surfactant, the aqueous firefighting foam composition may include about 1 to 20 wt. % or about 2 to 15 wt. % of the anionic surfactant. Typically, the aqueous firefighting foam concentrate may include about 5 to 15 wt. %, about 5 to 10 wt. % and, in some instances, about 7 to 8 wt. % of a the anionic surfactant. In some embodiments, the foam composition includes about 7.8 wt. % $C_{8-12}$-alkyl sulfate anionic surfactants.

In some embodiments, the aqueous firefighting foam composition may include an anionic surfactant comprising a $C_{8-14}$-alkyl sulfate salt and/or a $C_{8-14}$-alkyl sulfonate salt. In some embodiments, the aqueous firefighting foam concentrate may include an anionic surfactant, which includes one or more surfactants selected from $C_{8-12}$-alkyl sulfate salts and/or a $C_{8-12}$-alkyl sulfonate salts. For example, one or more of octyl sulfate salts, decyl sulfate salts, dodecyl sulfate salts, and tetradecyl sulfate salts may be suitable for use as anionic surfactants in the present foam concentrate. The anionic surfactant may suitably be a sodium, potassium and/or ammonium salt.

In some embodiments, the surfactant component of the composition is limited to an anionic surfactant and a zwitterionic surfactant. In other embodiments, the surfactant component of the composition is limited to an anionic surfactant and, optionally, a nonionic surfactant. In some embodiments including an anionic surfactant, the anionic surfactant includes one or more of aliphatic sulfate salt, aliphatic sulfonate salt, an aliphatic ether sulfate salt, and aliphatic ether sulfate salt. In other embodiments including an anionic surfactant, the anionic surfactant includes one or more of a $C_{8-14}$-alkyl sulfate salt, a $C_{8-14}$-alkyl ether sulfate salt and a $C_{8-14}$-alkyl sulfonate salt. In other embodiments including an anionic surfactant, the anionic surfactant includes one or more of an octyl sulfate salt, a decyl sulfate salt, a dodecyl sulfate salt and a tetradecyl sulfate salt. In some embodiments including a zwitterionic surfactant, the zwitterionic surfactant includes one or more of an aliphatic amidoalkyl hydroxysultaine, an aliphatic amidoalkyl betaine, an aliphatic sulfobetaine surfactant and an aliphatic betaine surfactant. In some embodiments including a zwitterionic surfactant, the zwitterionic surfactant includes a $C_{8-14}$-alkylamidopropyl hydroxysultaine. In some embodiments including a zwitterionic surfactant, the zwitterionic surfactant includes cocamidopropyl hydroxysultaine. In some embodiments, the zwitterionic surfactant includes laurylamidopropyl hydroxysultaine, myristylamidopropyl hydroxysultaine, or a mixture thereof. In some embodiments, the nonionic surfactant includes one or more of an alkyl polyglycoside, an aliphatic alcohol, an ethoxylated aliphatic alcohol, and an aliphatic amine oxide. In some embodiments, the composition is free of nonionic surfactant (s).

The aliphatic alcohol-based component of the firefighting foam compositions includes one or more C8-14-aliphatic alcohols and/or ethoxylates of C10-14-aliphatic alcohols having an average of no more than about 6 ethylene oxide units. In some embodiments, the composition also includes two or more $C_{8-14}$-aliphatic alcohols, which may be, for example, octyl alcohol and lauryl alcohol. In some embodiments, the composition also includes a water-miscible organic solvent. In some embodiments including a water-miscible organic solvent, the solvent may be one or more of a glycol, glycol ether, glycerol, or water-soluble polyethylene glycol (PEG). In some embodiments including a water-miscible organic solvent, the solvent may diethylene glycol n-butyl monoether, dipropylene glycol n-propyl monoether, hexylene glycol, ethylene glycol, dipropylene glycol, tripropylene glycol, dipropylene glycol monobutyl ether, dipropylene glycol monomethyl ether, ethylene glycol monobutyl ether, tripropylene glycol monomethyl ether, dipropylene glycol monopropyl ether, propylene glycol, glycerol, or a mixture of two or more thereof. In some embodiments including a water-miscible organic solvent, the solvent may be one or more of ethylene glycol, propylene glycol and butyl carbitol. In some embodiments, the composition also includes an alkanolamine.

The aqueous firefighting foam concentrates may include a zwitterionic surfactant. The zwitterionic surfactant may includes one or more of an aliphatic amidoalkyl betaine surfactant, an alkyl betaine surfactant, an alkyl sulfobetaine surfactant and an aliphatic amidoalkylene hydroxysultaine surfactant, such as an aliphatic amidopropyl hydroxysultaine surfactant. For example, the foam concentrate may include a zwitterionic surfactant, which includes one or more of a $C_{8-18}$-alkylamidopropyl hydroxysultaine surfactant, a $C_{8-18}$-alkylamidopropyl betaine surfactant a $C_{8-18}$-alkyl sulfobetaine surfactant and a $C_{8-18}$-alkyl betaine surfactant. Suitable examples of the aliphatic amidoalkylene hydroxysultaine surfactant include a $C_{8-18}$-alkylamidopropyl hydroxysultaine surfactant, such as a cocamidopropyl hydroxysultaine surfactant, which includes a laurylamidopropyl hydroxysultaine and a myristylamidopropyl hydroxysultaine. Suitable examples of the aliphatic amidoalkyl betaine surfactant include a $C_{8-18}$-alkylamidoalkyl betaine surfactant, such as a cocamidopropyl betaine, a tallowamidopropyl betaine, a laurylamidopropyl betaine or a myristylamidopropyl betaine. In some embodiments, the zwitterionic surfactant includes a $C_{8-14}$-alkylamidopropyl hydroxysultaine, such as a cocamidopropyl hydroxysultaine. In some embodiments, the zwitterionic surfactant includes laurylamidopropyl hydroxysultaine and/or myristylamidopropyl hydroxysultaine. In embodiments that include the zwitterionic surfactant, the aqueous firefighting foam concentrate may include about 1 to 15 wt. % or about 1 to 10 wt. % of the zwitterionic surfactant. In certain embodiments, the aqueous firefighting foam concentrate may include about 1 to 6 wt. %, or about 2 to 5 wt. % of the zwitterionic surfactant.

The aqueous firefighting foam compositions may optionally include a nonionic surfactant. That is, in some embodiments a nonionic surfactant may be included, while in other embodiment, the compositions are free of nonionic surfactants. Where present, the nonionic surfactant may include one or more of an aliphatic alcohol, an ethoxylated aliphatic alcohol, an alkylpolyglycoside surfactant, and an aliphatic amine oxide. Suitable examples of the aliphatic alcohol include $C_{8-16}$ fatty alcohol, either branched or unbranched. In some embodiments, the nonionic surfactant includes lauryl alcohol. Suitable examples of the aliphatic ethoxylated alcohol include ethoxylated $C_{8-16}$ fatty alcohol, either branched or unbranched, with a moderate to low degree of ethoxylation. In compositions including aliphatic alcohol ethoxylates, the ethoxylates may have an average of no more than about 6 and, or no more than about 4 ethylene oxide units, or often no more than about 2 ethylene oxide units. In some embodiments, the nonionic surfactant includes lauryl alcohol ethoxylate (1EO). Suitable examples of the alkylpolyglycoside include a $C_{8-16}$-alkylpolyglycoside having an average degree of polymerization of about 1.0-2.0, or about 1.0-1.5. The alkylpolyglycoside surfactant may suitably include a $C_{8-12}$-alkylpolyglycoside, such as a $C_{8-12}$-alkylpolyglucoside. Suitable examples of the alkylpolyglycoside include a $C_{9-11}$-alkylpolyglucoside, such as a $C_{9-11}$-alkylpolyglucoside having an average degree of polymerization of about 1.4-1.7. The $C_{9-11}$-alkylpolyglucoside may include a nonyl, decyl and/or an undecyl polyglucoside. Other suitable examples of the alkylpolyglycoside include a $C_{8-10}$-alkylpolyglucoside, which may have an average degree of polymerization of about 1.0-1.5. Suitable aliphatic amine oxides include amine oxides including an aliphatic alkyl group containing at least 8 carbon atoms, preferably 10 or more carbon atoms, more preferably 10 to 16 carbon atoms, especially 12 to 14 carbon atoms. The aliphatic group may be a straight chain or a branched chain group, but is preferably a straight chain group. The aliphatic amine oxide may be a mixture of aliphatic amine oxides having different chain lengths. Examples of aliphatic amine oxides that may be used in the present compositions include dodecyl amine oxide and dialkyl alkylamine oxides, such as diethyldecyl amine oxide, dimethyloctyl amine oxide, and dimethyldodecyl amine oxide. Of these, dialkyldodecyl amine oxides (e.g., dimethyllauryl amine oxide) may be employed. In embodiments that include the nonionic surfactant, the aqueous firefighting foam composition may suitably include about 0.5 to 10 wt. % of the nonionic surfactant. Typically, the aqueous firefighting foam composition may include about 0.5 to 5 wt. % and, in some instances about 0.5 to 2.5 wt. % of a nonionic surfactant, such as a $C_{8-12}$-alkylpolyglycoside.

The aqueous firefighting foam compositions may include a water-miscible solvent, which may suitably include one or more of a glycol, a glycol ether, glycerol and a water-soluble polyethylene glycol. Examples of suitable organic solvents include diethylene glycol n-butyl ether, dipropylene glycol n-propyl ether, hexylene glycol, ethylene glycol, propylene glycol, diethylene glycol, dipropylene glycol, tripropylene glycol, dipropylene glycol monobutyl ether, dipropylene glycol monomethyl ether, diethylene glycol monobutyl ether ("butyl carbitol"), ethylene glycol monobutyl ether, tripropylene glycol monomethyl ether, dipropylene glycol monoethyl ether, glycerol, and mixtures of two or more thereof. The organic solvent may include a mixture of an alkylene glycol and a glycol ether, such as a glycol butyl ether. In some embodiments, the organic solvent includes an alkylene glycol ether, such as ethylene glycol monoalkyl ether, propylene glycol monoalkyl ether, dipropylene glycol monoalkyl ether (e.g., and/or diethylene glycol monoalkyl ether (e.g., butyl carbitol). In some embodiments, the organic solvent includes an alkylene glycol, such as ethylene glycol, propylene glycol, dipropylene glycol and/or diethylene glycol. In another suitable example, the organic solvent includes butyl carbitol. The foam composition may suitably include about 1 to 20 wt. %, about 2 to 10 wt. %, about 3 to 8 wt. %, or about 3 to 7 wt. % of the organic solvent.

In one aspect, the aqueous firefighting foam concentrates include an aliphatic alcohol-based component, such as an aliphatic alcohol and/or an aliphatic alcohol ethoxylate. For example, the concentrate may include an aliphatic alcohol-based component including an aliphatic alcohol having 8 to 14 carbon atoms or an aliphatic alcohol ethoxylate having 10 to 16 carbon atoms in its alcohol portion. Alternatively, the concentrate may include a mixture of an aliphatic alcohol having 8 to 14 carbon atoms and an aliphatic alcohol ethoxylate having 10 to 16 carbon atoms in its alcohol portion. In such mixtures, the ratio of aliphatic alcohol to aliphatic alcohol ethoxylate may be in range of about 10:1 to 1:10, or about 5:1 to 1:5, about 2:1 to 1:2, about 1.5:1 to 1:1:5, or about 1:1. The foam concentrate may suitably include about 0.1 to 5 wt. %, about 0.5 to 3 wt. %, or about 0.5 to 2 wt. % of the aliphatic alcohol-based nonionic surfactant. The aliphatic alcohol ethoxylate may have an average degree of polymerization (i.e., the average number of ethylene oxide units) of about 0.5-6.0 and often of no more than about 4.0, desirably no more than about 3.0 or no more than about 2.0. Aliphatic alcohols, which include a linear $C_{8-14}$-aliphatic alcohol, such as a $C_{8-14}$-fatty alcohol, are suitable for use as a nonionic surfactant in the present concentrates. Suitable examples of such alcohols include one or more of octyl alcohol, decyl alcohol, lauryl alcohol and myristyl alcohol. The foam concentrate may include an aliphatic alcohol ethoxylate having an average of no more than about 3 ethylene oxide units. The aliphatic alcohol portion of such ethoxylates typically has about 10 to 16 carbon atoms. Suitable examples include decyl alcohol ethoxylates, lauryl alcohol ethoxylates, myristyl alcohol ethoxylates, and/or cetyl alcohol ethoxylates. Such ethoxylates may have an average of no more than about 3 ethylene oxide units, no more than about 2.0 ethylene oxide units, no more than about 1.5 ethylene oxide units and, in some instances, no more than about 1 ethylene oxide units. In one suitable embodiment, the aliphatic alcohol ethoxylate includes an ethoxylate of a linear $C_{8-14}$-aliphatic alcohol having no more than about 1.2 ethylene oxide units.

The aliphatic alcohol-based component may include an aliphatic alcohol ethoxylate. The aliphatic alcohol ethoxylate may have an average degree of polymerization (i.e., the average number of ethylene oxide units) of about 0.5-6.0 and often of no more than about 4.0, desirably no more than about 3.0 or no more than about 2.0. Aliphatic alcohols, which include a linear $C_{8-14}$-aliphatic alcohol, such as a $C_{8-14}$-fatty alcohol, are suitable for use as a nonionic surfactant in the present concentrates. Suitable examples of such alcohols include one or more of octyl alcohol, decyl alcohol, lauryl alcohol and myristyl alcohol. The foam concentrate may include an aliphatic alcohol ethoxylate having an average of no more than about 3 ethylene oxide units. The aliphatic alcohol portion of such ethoxylates typically has about 10 to 16 carbon atoms. Suitable examples include decyl alcohol ethoxylates, lauryl alcohol ethoxylates, myristyl alcohol ethoxylates, and/or cetyl alcohol ethoxylates. Such ethoxylates may have an average of no more than about 3 ethylene oxide units, no more than about 2.0 ethylene oxide units, no more than about 1.5 ethylene oxide units and, in some instances, no more than about 1 ethylene oxide units. In one suitable embodiment, the aliphatic alcohol ethoxylate includes an ethoxylate of a linear $C_{8-14}$-aliphatic alcohol having no more than about 1.2 ethylene oxide units.

The aqueous firefighting foam composition includes a polysaccharide thickener, which includes succinoglycan. The polysaccharide thickener may include succinoglycan and a second polysaccharide that is less soluble or insoluble in the aqueous firefighting foam concentrate. In some embodiments, the second polysaccharide may be insoluble (and dispersed) in the aqueous firefighting concentrate but may be soluble in water alone or in solutions where the concentrate has been diluted with a much larger volume of water. In other embodiments, the concentrate may only include one or more polysaccharides that are completely soluble in the concentrate. The foam concentrate may includes about 0.1 to 5 wt. %, about 1 to 4 wt. %, and, often, about 1.5 to 3 wt. % of succinoglycan. In some embodiments, the foam concentrate includes about 2 to 4.5 wt. % of a mixture of polysaccharide thickeners, e.g., a mixture of succinoglycan and xanthan gum or diutan gum.

Examples of suitable polysaccharide thickeners which may be used as the second polysaccharide component in the present foam compositions include agar, sodium alginate, carrageenan, gum arabic, gum guaicum, neem gum, pistacia lentiscus, gum chatti, caranna, galactomannan, gum tragacanth, karaya gum, guar gum, welan gum, rhamsam gum, locust bean gum, beta-glucan, cellulose, methylcellulose, chicle gum, kino gum, dammar gum, glucomannan, mastic gum, spruce gum, tara gum, gellan gum, acacia gum, cassia gum, diutan gum, fenugreek gum, ghatti gum, hydroxyethylcellulose, hydroxypropylmethylcellulose, karaya gum, konjac gum, pectin, propylene glycol alginate, and a mixture of two or more thereof.

In some embodiments, the polysaccharide thickener may include succinoglycan in combination with one or more of xanthan gum, diutan gum, rhamsan gum, welan gum, gellan gum, guar gum, konjac gum, welan gum, tara gum, and methylcellulose. In some embodiments, it may advantageous to include a mixture of succinoglycan and one or more of xanthan gum, diutan gum, rhamsan gum, gellan gum, guar gum, konjac gum, welan gum, tara gum, and methylcellulose. In other embodiments, the foam concentrate may include a mixture of succinoglycan and one or more of xanthan gum, diutan gum, rhamsan gum, welan gum, and gellan gum as the polysaccharide thickener. In other embodiments, the foam concentrate may advantageously include one or more of xanthan gum, welan gum, diutan gum and/or rhamsan gum.

Polysaccharide thickeners including a combination of succinoglycan and xanthan gum may be particularly suitable for use in the present foam concentrates. For example, the foam concentrate may include succinoglycan in the amounts already mentioned and about 0.2 to 3 wt. %, about 1.0 to 3 wt. %, and even, about 2 to 2.5 wt. % xanthan gum. Such foam concentrates may also include about 0.1 to 2 wt. %, about 0.5 to 2 wt. % or even, about 0.2 to 1.0 wt. % xanthan gum.

In other instances, polysaccharide thickeners, which include a combination of succinoglycan and welan gum, may be particularly suitable for use in the present foam concentrates. For example, the foam concentrate may include succinoglycan in the amounts already mentioned and about 0.2 to 4 wt. %, about 1.0 to 3 wt. %, and even, about 1 to 2.5 wt. % welan gum. Such foam concentrates may also include and about 0.5 to 5 wt. %, about 0.5 to 4 wt. % or even, about 1 to 3 wt. % welan gum.

As discussed above, the aqueous firefighting foam composition includes water. In some embodiments, the water may be water from a municipal water source (e.g., tap water). In some embodiments, the water is a purified water, such as purified water that meets the standards set forth in the United States Pharmacopeia, which is incorporated by reference herein in relevant part. In some embodiments, the aqueous firefighting foam composition includes at least about 30 wt. % water, often at least about 40 wt. % water, or at least about 50 wt. % water. In some embodiments, the aqueous firefighting foam concentrate includes greater than about 60 wt. % water. In some embodiments, the aqueous firefighting foam composition may be produced using a source of water that has a total concentration of fluorine atoms on a weight percentage basis of no more than about 70 ppt F.

The aqueous firefighting foam compositions of the present disclosure may be substantially free of any fluorinated compounds. As used herein, the "phrase substantially free of fluorinated compounds" means that the aqueous firefighting foam composition includes no more than 0.01 wt. % of fluorinated compounds. In some embodiments, the aqueous firefighting foam composition includes no more than 0.005 wt. % of fluorinated compounds. In some embodiments, the aqueous firefighting foam compositions of the present disclosure may be substantially free of fluorine. As used herein, the phrase "substantially free of fluorine" means that the composition has a total concentration of fluorine atoms on a weight percentage basis of no more than about 70 part per trillion (ppt) F. The aqueous firefighting foam compositions of the present disclosure preferably include substantially less than 70 ppt F.

In some embodiments, the aqueous firefighting foam composition includes one or more chelators or sequestering buffers. Illustrative and non-limiting chelators and sequestering buffers include agents that sequester and chelate metal ions, including polyamino-polycarboxylic acids, ethylenediaminetetraacetic acid, citric acid, tartaric acid, nitrilotriacetic acid, hydroxyethylethylenediaminetriacetic acid and salts thereof. Illustrative buffers include Sorensen's phosphate or McIlvaine's citrate buffers.

In some embodiments, the aqueous firefighting foam composition includes one or more corrosion inhibitors. Illustrative and non-limiting corrosion inhibitors includes ortho-phenylphenol, tolyltriazole, and phosphate ester acids. In some embodiments, the corrosion inhibitor may be tolyltriazole.

In some embodiments, the aqueous firefighting foam concentrate may also include a metallic salt, typically a metallic salt, which includes a multi-valent cation. For example, suitable salts may include a cation selected from the group consisting of aluminum, calcium, copper, iron, magnesium, potassium, and calcium cations. The counterานion may suitably be a sulfate and/or phosphate anion. In some embodiments, the composition may optionally contain a divalent metal salt, such as magnesium salt (e.g. magnesium sulfate and/or magnesium acetate). In one embodiment, the metallic salt may include magnesium sulfate.

In some embodiments, the aqueous firefighting foam concentration may include a reducing agent. Accordingly, an aqueous fire-fighting foam concentrate may include a sugar component including a monosaccharide sugar, a sugar alcohol, or a combination thereof, and a reducing agent. The aqueous fire-fighting foam concentration may further include a polysaccharide thickener, a surfactant component including an anionic surfactant, a zwitterionic surfactant, and an aliphatic alcohol-based nonionic surfactant, a water-miscible organic solvent, and at least about 30 wt. % water. When present, the reducing agent may be present in the foam concentration from about 0.01 wt % to about 5 wt %. This may include from about 0.01 wt % to about 3 wt %, from about 0.05 wt % to about 5 wt %, from about 1 wt % to about 5 wt %, or from about 1 wt % to about 3 wt %.

The reducing agent may be selected such that it is more readily oxidized compared to other components of the foam. For example, the reducing agent may be oxidized more readily than the sugar component or polysaccharide components. Illustrative reducing agents include, but are not limited to, sodium sulfite, sodium bisulfite, sodium metabisulfite, or a mixture of any two or more thereof.

In some embodiments, the aqueous firefighting foam concentrate may include a microfibrous cellulose. The microfibrous cellulose may be prepared by microbial fermentation or by mechanically disrupting/altering cereal, wood, or cotton-based cellulose fibers. When microfibrous cellulose prepared by microbial fermentation ("fermentation derived cellulose" or "FDC"), e.g., microfibrous cellulose prepared by bacterial fermentation ("bacterially-derived microfibrous cellulose") is utilized, the elimination of cellular debris may allow the production of transparent solutions at typical use levels. Microfibrous cellulose may function in viscous aqueous systems because it is dispersed rather than solubilized, thereby providing suspension properties in formulations that might otherwise display hazing and/or precipitation often seen using alternative solubilized polymer suspension agents.

A number of commercially available blends of microfibrous cellulose (MFC) with co-agents, which are suitable for use in the present concentrates, have been reported. For example, there have been reports of such materials that may contain either a mixture of microfibrous cellulose, xanthan gum, and carboxymethyl cellulose (CMC) in a ratio of 6:3:1, or a mixture of microfibrous cellulose, guar gum, and CMC in a ratio of 3:1:1. These blends allow the microfibrous cellulose to be prepared as a dry product that can be "activated" with high shear mixing into water or other water-based solutions. "Activation" occurs when these microfibrous cellulose blends are added to water and the polysaccharide co-agents become hydrated. After the hydration of the co-agents, high shear is generally needed to effectively disperse the microfibrous cellulose fibers to produce a three-dimensional functional network.

Illustrative microfibrous cellulose that may be suitable for use in the present concentrates include those sold under the tradename CELLULON™ Fermentation-Derived Cellulose (FDC). CELLULON™ FDC is marketed as an eco-friendly alternative derived from a microbial fermentation process. This may be sold in a liquid form (CELLULON™ Cellulose Liquid, available from CP Kelco). This pre-activated FDC solution offers functionality in high surfactant systems where other hydrocolloids may degrade over time. Alternatively, CELLULON™ FDC is available in a dry powder form, which requires activation via hydration with water and high shear mixing of the aqueous blend. One of products sold under the CELLULON™ cellulose tradename is a mixture containing fermentation-derived cellulose together with maltodextrin and sodium carboxymethyl cellulose (NaCMC) co-agents. In some instances, such a blend may include about 5 to 50 wt. % or, more commonly, about 10 to 30 wt. % fermentation-derived cellulose together with a suitable co-agent(s).

As used herein, the term "fermentation-derived cellulose" (FDC) refers to any microfibrous cellulose produced by a microbial fermentation process (as opposed to materials produced by mechanically disrupting/altering cellulose fibers). CELLULON™ Fermentation-Derived Cellulose products are examples of suitable FDC material that may be used in the present firefighting foam concentrates.

The cellulose fibers of an activated FDC material commonly have a very fine diameter and, once activated, exist as a three-dimensional, highly reticulated net-like structure that gives a very high surface area-to-weight ratio. This three-dimensional, net-like structure can allow the FDC to create a true yield value at low concentrations in a formulation, even those with little or no water, and so provide a mechanism for reliable structuring of liquids and stabilization of components with minimal or no impact on a finished product's viscosity and dispersability.

The microfibrous cellulose included in the present compositions may suitably include microfibrous cellulose produced by mechanically disrupting/altering cellulose fibers, e.g., cereal, wood, and/or cotton-based cellulose fibers—commonly referred to as microfibrillated cellulose (MFC). Microfibrillated cellulose can be obtained through a fibrillation process of cellulose fibers. In such a process, the mechanical shearing can strip away the outer layer of the cellulose fibers, exposing the fibril bundles. The macroscopic fibers are typically mechanically sheared until the fibrils are released, resulting in separation of the cellulose fibers into a three dimensional network of microfibrils with a very large surface area. The exposed fibrils are much smaller in diameter compared to the original fibers, and can form a network or a web-like structure.

One suitable example of microfibrillated cellulose is Exilva™ microfibrillated cellulose (available from Borregaard, Sarpsborg, Norway). Exilva™ microfibrillated cellulose is a pre-activated product, available as a 2% suspension or a 10% paste, that is produced from mechanically disrupting cellulose sourced from Norway spruce. Exilva™ microfibrillated cellulose is reported to be an insoluble microfibrillated cellulose consisting of an entanglement of the cellulose fibers, which has the ability to interact both physically through its extreme surface area and chemically through hydrogen bonding. Other commercial sources of microfibrous cellulose include Celova® microfibrillated cellulose (available from Weidmann Electrical Technology AG (Rapperswil, Switzerland) and Curran® microfibrillated cellulose (available from CelluComp, Fife, Scotland). Curran® microfibrillated cellulose is produced from extraction of nanocellulose fibers from waste streams of root vegetables, primarily carrots and sugar beet pulp.

Another suitable example of a source of microfibrillated cellulose for use in the present compositions is microfibrillated cellulose-mineral composite commercially available from FiberLean® Technologies (Par Moor Centre, United Kingdom). The FiberLean® MFC-composite is reportedly produced by fibrillating the cellulose fibers in the presence of one of a number of different minerals, such as calcium carbonate, clay (e.g., kaolin or bentonite), alumina, zirconia, graphite, silicate or talc, to obtain a nano-fibrillar cellulose suspension.

In many embodiments, the present concentrates may include about 0.1 to 5 wt. %, about 0.5 to 5 wt. % about 1 to 4 wt. % or, in some instances, about 0.5 to 3 wt. % of a suspension agent, which includes microfibrous cellulose. The microfibrous cellulose may include a fermentation-derived cellulose, such as a microfibrous cellulose derived from a microbial fermentation process. In some embodiments, the microfibrous cellulose includes cellulose derived from a bacterial fermentation process, e.g., from fermentation of a *Komagataeibacter xylinus* strain or a *Acetobacter xylinum* strain. Fermentation-derived cellulose (FDC) produced by such a method may have an average fiber diameter of about 0.1-0.2 μm. This very small fiber size and diameter means that a given weight of FDC can have up to 200 times more surface area than other common forms of cellulose.

In many embodiments of the present concentrates, a suspension agent includes microfibrous cellulose together with one or more co-agents. The co-agent(s) may suitable include a water-soluble oligosaccharide and/or water-soluble polysaccharide. The suspension agent may suitable include about 5 to 75 wt. % and, in some instances, about 5 to 50 wt. % or about 10 to 30 wt. % of the microfibrous cellulose. The suspension agent may typically include about 25 to 95 wt. % and, in some instances, about 50 to 90 wt. % or about 70 to 90 wt. % of a co-agent. The co-agent may include a water-soluble oligosaccharide, such as maltodextrin. In other instances, the suspension agent may include a water-soluble polysaccharide co-agent, such as one or more of carboxymethyl cellulose (CMC), a carboxymethyl cellulose salt, xanthan gum and guar gum. In one suitable embodiment, the suspension agent includes fermentation-derived cellulose together with a co-agent including sodium carboxymethyl cellulose and maltodextrin.

The microfibrous cellulose employed in the present concentrates may suitably have an average fiber diameter of no more than about 10 μm, commonly no more than about 1 μm and in some instances about 50 to 300 nm (0.05-0.3 μm). The microfibrous cellulose may be derived from microbial fermentation. Prior to inclusion in the present concentrates, such microbial fermentation derived cellulose is commonly activated by combining a powdered microfibrous cellulose and any optional co-agent with water and then mixing with high shear.

In some embodiments, the present concentrates may include about 0.1 to 5 wt. %, about 0.2 to 5 wt. % about 0.5 to 4 wt. %, or, in some instances, about 0.5 to 3 wt. % microfibrous cellulose. As described herein, the microfibrous cellulose may include fermentation derived cellulose (FDC), microfibrillated cellulose, or a combination thereof. In many instances, the microfibrous cellulose may be formulated together with a co-agent, such as a water-soluble oligosaccharide and/or water-soluble polysaccharide.

In some embodiments, the aqueous firefighting foam concentrate may also include a preservative, such as one or more antimicrobial compounds and/or biocidal compounds. These components are included to prevent the biological decomposition of natural product based polymers that may be incorporated as polymeric film formers (e.g., a polysaccharide gum). Examples of suitable antimicrobial/biocidal compounds include Kathon CG/ICP (Rohm & Haas Company), Givgard G-4 40 (Givaudan, Inc.), Dowicil 75 and Dowacide A (Dow Chemical Company).

Tables A-G provide examples of firefighting compositions that are suitable under the present disclosure. The compositions are designed to be combined with a diluent, aerated, and administered to as a firefighting foam fight and/or suppress a fire.

TABLE A

Illustrative Concentrate Formulation

| Ingredient | Amount (Wt. %) |
|---|---|
| Biocide | 0-0.2 |
| Corrosion Inhibitor | 0-0.2 |
| Water | 30-85 |
| Zwitterionic Surfactant | 1-15 |
| Anionic Surfactant | 2-20 |
| Polysaccharide Gum incl. Succinoglycan | 0.1-5 |
| Water-miscible organic solvent | 1-20 |
| Monosaccharide sugar(s) and/or sugar alcohol(s) | 5-30 |
| Alkanolamine | 0-5 |

TABLE B

Illustrative Concentrate Formulation

| Ingredient | Amount (Wt. %) |
|---|---|
| Biocide | 0-0.2 |
| Corrosion Inhibitor | 0-0.2 |
| Water | 40-75 |
| Hydroxysultaine Zwitterionic Surfactant | 1-10 |
| Alkyl Sulfate Anionic Surfactant | 5-15 |
| Polysaccharide Gum incl. Succinoglycan | 0.2-4 |
| Glycol Ether Solvent | 2-15 |
| Polyol Solvent | 0-10 |
| Monosaccharide sugar(s) and/or sugar alcohol(s) | 5-25 |
| Alkanolamine | 0.1-5 |

TABLE C

Illustrative Concentrate Formulation

| Ingredient | Amount (Wt. %) |
|---|---|
| Tolytriazole (corrosion inhibitor) | 0~0.09 |
| Antimicrobial | 0~0.05 |
| Alkyl sulfo-betaine surfactant | 1-8 |
| Octyl sulfate surfactant | 1~5 |
| Lauryl sulfate surfactant | 1~5 |
| Fatty alcohol surfactant | 0.5-2 |
| Xanthan gum & succinoglycan | 0.2-4 |
| Magnesium sulfate | 1~3 |
| Butyl carbitol | 1-10 |
| Alkylene glycol solvent | 0-10 |
| Water | Balance |

TABLE D

| Illustrative Concentrate Formulation | |
|---|---|
| Ingredient | Amount (Wt. %) |
| Tolytriazole (corrosion inhibitor) | 0~0.09 |
| Antimicrobial | 0~0.05 |
| Alkyl sulfo-betaine surfactant | 1-5 |
| Alkyl sulfate surfactant | 1~5 |
| Alkyl polysaccharide surfactant | 2-6 |
| Xanthan gum & succinoglycan | 0.2-4 |
| Magnesium sulfate | 1~3 |
| Alkylene glycol ether solvent | 0-10 |
| Alkylene glycol solvent | 0-10 |
| Water | Balance |

TABLE E

| Illustrative Concentrate Formulation | |
|---|---|
| Ingredient | Amount (Wt. %) |
| Biocide | 0-0.2 |
| Corrosion Inhibitor | 0-0.2 |
| Water | 30-85 |
| Zwitterionic Surfactant | 1-15 |
| Anionic Surfactant | 2-20 |
| Polysaccharide Gum incl. Succinoglycan | 0.1-5 |
| Water-miscible organic solvent | 1-20 |
| Monosaccharide sugar(s) and/or sugar alcohol(s) | 5-30 |
| Alkanolamine | 0-5 |
| Reducing Agent | 0.01-5 |

TABLE F

| Illustrative Concentrate Formulation | |
|---|---|
| Ingredient | Amount (Wt. %) |
| Biocide | 0-0.2 |
| Corrosion Inhibitor | 0-0.2 |
| Water | 30-85 |
| Zwitterionic Surfactant | 1-15 |
| Anionic Surfactant | 2-20 |
| Polysaccharide Gum incl. Succinoglycan | 0.1-5 |
| Water-miscible organic solvent | 1-20 |
| Monosaccharide sugar(s) and/or sugar alcohol(s) | 5-30 |
| Alkanolamine | 0-5 |
| Reducing Agent | 0.01-5 |
| Microfibrous cellulose | 0.01-5 |

TABLE G

| Illustrative Concentrate Formulation | |
|---|---|
| Ingredient | Amount (Wt. %) |
| Biocide | 0-0.2 |
| Corrosion Inhibitor | 0-0.2 |
| Water | 30-85 |
| Zwitterionic Surfactant | 1-15 |
| Anionic Surfactant | 2-20 |
| Polysaccharide Gum incl. Succinoglycan | 0.1-5 |
| Water-miscible organic solvent | 1-20 |
| Monosaccharide sugar(s) and/or sugar alcohol(s) | 5-30 |
| Alkanolamine | 0-5 |
| Microfibrous cellulose | 0.01-5 |

The aqueous firefighting compositions may advantageously be substantially free of any fluorinated compounds. As used herein, the "phrase substantially free of fluorinated compounds" means that the aqueous firefighting composition includes no more than 0.1 wt. % fluorinated compounds. In some embodiments, the aqueous firefighting composition includes no more than 0.01 wt. % and, in some instances, no more than about 0.005 wt. % fluorinated compounds. The aqueous firefighting compositions of the present disclosure may be substantially free of fluorine in any form. As used herein, the phrase "substantially free of fluorine" means that the aqueous firefighting composition has a total concentration of fluorine atoms on a weight percentage basis of no more than about 70 ppt F.

EXAMPLES

The following examples more specifically illustrate formulations for preparing aqueous firefighting compositions according to various embodiments described herein. These examples should in no way be construed as limiting the scope of the present technology.

Example A

Tables 1 and 2 below show the compositions of a number of illustrative formulations of the aqueous firefighting foam concentrate. The amounts shown in these tables represent the weight percentage of the particular component based on the total weight of the composition. Table 1 shows the composition of two base formulations that could be used to prepare a number of different examples of the present concentrate. The base formulations includes a biocide; a corrosion inhibitor, such as tolyltriazole; an aliphatic alcohol-based component; anionic surfactant(s), such as the triethanolamine salt of lauryl sulfate (TEA-lauryl sulfate) and sodium octyl sulfate; a zwitterionic surfactant, such as cocamidopropyl hydroxysultaine; a polysaccharide thickener, including succinoglycan; a water-miscible organic solvent, such as 1,2-propylene glycol and/or butyl carbitol; an alkanolamine, such as triethylolamine; a divalent metal salt, such as magnesium sulfate; and water. The specific aliphatic alcohol-based component is detailed in Table 2.

TABLE 1

| Example Base Formulation | | |
|---|---|---|
| Ingredient (wt. %) | Base Formula | Base Formula A |
| Biocide | 0.02 | 0.02 |
| Tolyltriazole | 0.05 | 0.05 |
| Alcohol-based Component | 0.3-3.0 | 0.5-1.5 |
| TEA-lauryl sulfate | 3-4 | 3.2 |
| Na octyl sulfate | 3-4 | 3.2 |
| Decyl sulfate | 0.5-2 | 1.6 |
| Cocamidopropyl hydroxysultaine | 3-5 | 4 |
| Polysaccharide | 1-4 | 2-3.2 |
| Butyl carbitol | 3-10 | 5 |
| Fructose/glucose | 12-18 | 14 |
| TEA | 0.1-0.2 | 0.1 |
| Magnesium sulfate | 0.5-2 | 1 |
| Water (Balance) | ~60-75 | ~63-65 |

TABLE 2

| Examples Aliphatic Alcohol and Polysaccharide Components | | | |
|---|---|---|---|
| Example | Alcohol-based Component/ Polysaccharide Component | Wt. % Alcohol-based Component(s) | Wt. % Polysaccharide Component |
| A1 | Lauryl alcohol Xanthan gum/succinoglycan | 1.4 | 0.5/2.0 |
| A2 | Lauryl alcohol Xanthan gum/succinoglycan | 1.0 | 0.5/1.5 |
| A3 | Octyl alcohol/lauryl alcohol Xanthan gum/succinoglycan | 0.75/0.75 | 0.7/2.5 |
| A4 | Decyl alcohol/lauryl alcohol Xanthan gum/succinoglycan | 0.5/0.5 | 0.5/1.5 |
| A5 | Octyl alcohol/lauryl alcohol Xanthan gum/succinoglycan | 0.25/0.25 | 0.5/2.0 |
| A6 | Octyl alcohol/lauryl alcohol Guar gum/succinoglycan | 0.75/0.75 | 0.7/2.5 |
| A7 | Ethox. (2 EO) lauryl alcohol Xanthan gum/succinoglycan | 1.5 | 0.5/2 |
| A8 | Lauryl alcohol/Ethox. (1EO) lauryl alcohol Guar gum/succinoglycan | 0.5/0.5 | 0.5/1.5 |
| A9 | Ethox. (3EO) lauryl alcohol Xanthan gum/succinoglycan | 1.5 | 0.5/2 |
| A10 | Octyl alcohol/lauryl alcohol Xanthan gum/succinoglycan | 0.5/0.5 | 0.5/1.5 |

Example B

Table 3 below shows the compositions of four additional illustrative formulations of the aqueous firefighting foam composition.

TABLE 3

| | Examples | | | | |
|---|---|---|---|---|---|
| Ingredient (wt. %) | C-1 | C-2 | C-3 | C-4 | C-5 |
| Biocide | 0.02 | 0.02 | 0.02 | 0.02 | 0.02 |
| Tolyltriazole | 0.05 | 0.05 | 0.05 | 0.05 | 0.05 |
| Octanol | 0.25 | 0.5 | — | — | 0.2 |
| Lauryl alcohol | 0.25 | 0.5 | 0.8 | — | 0.2 |
| Lauryl alcohol ethoxylate (1EO) | — | — | 0.8 | 1.2 | — |
| TEA-lauryl sulfate | 3.2 | 3.2 | 3.5 | 3 | 3.2 |
| Na octyl sulfate | 3.2 | 3.2 | 3.5 | 3 | 3.2 |
| Decyl sulfate | 0.8 | 1.2 | — | — | — |
| Na 2-ethylhexyl sulfate | — | — | — | 1.2 | 0.8 |
| Cocamidopropyl hydroxysultaine | 4 | 5 | 4 | 5 | 4 |
| Xanthan gum | 0.5 | 0.8 | 0.8 | 0.5 | 0.5 |
| Succinoglycan | 2 | 2.5 | 2 | 2.5 | 2 |
| Butyl carbitol | 5 | 7 | 3 | 5 | 5 |
| Fructose/glucose | 18 | 14 | 17 | 15 | 18 |
| TEA | 0.1 | 0.1 | 0.2 | 0.1 | — |
| Magnesium sulfate | 1 | 1.25 | 1 | 1.25 | 1 |
| Water | Balance | Balance | Balance | Balance | Balance |

Method of Producing a Firefighting Foam

The firefighting foam compositions described herein may be mixed with a diluent to form firefighting foam precursor solution, i.e., a use strength composition. The firefighting foam precursor solution may be aerated (e.g., using a nozzle) to produce a firefighting foam including the firefighting foam concentrate and the diluent. Typically, the concentrate is mixed into a flowing stream of the diluent, e.g., the concentrate is introduced through the use of an eductor into a stream of the diluent flowing through a hose or pipe. Illustrative diluents may include water, such as fresh water, brackish water, sea water, and combinations thereof. In some embodiments, the firefighting foam compositions described above may be 1 vol. %, 3 vol. %, or 5 vol. % concentrate solutions, meaning that the firefighting foam compositions are mixed with 99 vol. %, 97 vol. %, or 95 vol. % diluent, respectively, to form the firefighting foam precursor solution.

In some instances, it has been found that the order of addition of ingredients with appropriate agitation in producing the present concentrates may impact the actual firefighting performance as seen in the UL and EN fire tests. It may be suitable to begin by mixing all or a portion of a water-miscible solvent component with a substantial amount of water and subsequently preparing a solution or slurry of the polysaccharide thickener in the resulting aqueous solution prior to blending in the remaining components of the foam concentrate. It was found that first preparing an aqueous solution by combining and mixing water-miscible solvent with water may facilitate later dissolution and/or dispersal of biogums/biopolymers (e.g., xanthan gum). This can allow the gums to properly hydrate without encapsulating (clumping) upon the addition of the surfactant(s), other optional compounds and remaining amounts of water. Surfactants and other optional compounds can then be added and the resulting mixture may finally be diluted further with water to decrease the viscosity of the preparation, if desired.

Firefighting foams that were prepared not following this order of component addition may result in polysaccharide biogums that are encapsulated, but not fully hydrated, which can result in the production of foams that exhibit less than satisfactory for fire suppression performance. Thus, in some embodiments, the initial formation of an aqueous solution containing water-miscible solvent can be important in process order and can be used to dissolve/disperse polysaccharide thickener(s) into the foam concentrate before addition of any other ingredients, such as surfactant(s) and/or other compounds.

Method of Fighting a Fire

The firefighting foam compositions described herein may be used to fight a fire and/or to suppress flammable vapors by mixing the firefighting foam compositions with a diluent, aerating the resulting firefighting foam precursor solution to form a firefighting foam, and administering the firefighting foam to a fire or applying the firefighting foam to the surface of a volatile flammable liquid (e.g., gasoline or other flammable hydrocarbon or a flammable polar solvent).

Illustrative Embodiments

Reference is made to a number of illustrative embodiments of the subject matter described herein. The following embodiments describe illustrative embodiments that may include various features, characteristics, and advantages of the subject matter as presently described. Accordingly, the following embodiments should not be considered as being comprehensive of all of the possible embodiments or otherwise limit the scope of the methods, materials, and compositions described herein.

The present application is directed to aqueous foam compositions in concentrate form, which can be diluted with an aqueous diluent to provide a foam precursor composition, which may be aerated to form a firefighting foam. In one embodiment, an aqueous firefighting compositions includes a sugar component; a surfactant component containing one or more of an anionic surfactant, a zwitterionic surfactant, and optionally a nonionic surfactant; and a polysaccharide thickener including succinoglycan. Such a composition may also include one or more of an alkanolamine, a glycol solvent, a glycol ether solvent, an aliphatic alcohol-based component and a magnesium salt. In some embodiments, the sugar component is made up of at least about 50 wt. % of a monosaccharide or sugar alcohol. The aqueous firefighting compositions disclosed herein may also include an organic solvent, e.g., a water-miscible organic solvent such as an alkylene glycol, glycerol, a water-soluble polyethylene glycol and/or a glycol ether, and may also contain an aliphatic alcohol-based component.

The composition may also contain additional polysaccharide thickeners, such as a natural gum. For example, the polysaccharide thickener may include xanthan gum, diutan gum, rhamsan gum, welan gum, gellan gum, guar gum, konjac gum, tara gum, and methylcellulose. In some embodiments, the polysaccharide thickener includes one or more of agar, sodium alginate, carrageenan, gum arabic, gum guaicum, neem gum, pistacia lentiscus, gum chatti, caranna, galactomannan, gum tragacanth, karaya gum, guar gum, xanthan gum, welan gum, rhamsam gum, locust bean gum, beta-glucan, cellulose, methylcellulose, chicle gum, kino gum, dammar gum, glucomannan, mastic gum, spruce gum, tara gum, gellan gum, acacia gum, cassia gum, diutan gum, fenugreek gum, ghatti gum, hydroxyethylcellulose, hydroxypropylmethyl-cellulose, karaya gum, konjac gum, pectin, and propylene glycol alginate. The composition may desirably be substantially free of any fluorinated surfactant (s), e.g., contain no more than 0.01 wt. % fluorinated surfactant(s) and, often, is completely free of any fluorinated surfactant or other fluorinated compound.

In some embodiments, the surfactant component includes an anionic surfactant and a zwitterionic surfactant. In some embodiments, the composition is free of nonionic surfactant (s). In other embodiments, the surfactant component of the composition includes an anionic surfactant and a nonionic surfactant. In some embodiments including an anionic surfactant, the anionic surfactant includes one or more of aliphatic sulfate salt, aliphatic sulfonate salt, an aliphatic ether sulfate salt, and aliphatic ether sulfate salt. In other embodiments including an anionic surfactant, the anionic surfactant includes one or more of a $C_{8-14}$-alkyl sulfate salt, a $C_{8-14}$-alkyl ether sulfate salt and a $C_{8-14}$-alkyl sulfonate salt. In other embodiments including an anionic surfactant, the anionic surfactant includes one or more of an octyl sulfate salt, a decyl sulfate salt, a dodecyl sulfate salt, and a tetradecyl sulfate salt. In some embodiments including a zwitterionic surfactant, the zwitterionic surfactant includes one or more of an aliphatic amidoalkyl hydroxysultaine, an aliphatic amidoalkyl betaine, an aliphatic sulfobetaine surfactant and an aliphatic betaine surfactant. In some embodiments including a zwitterionic surfactant, the zwitterionic surfactant includes a $C_{8-14}$-alkylamidopropyl hydroxysultaine. In some embodiments including a zwitterionic surfactant, the zwitterionic surfactant includes cocamidopropyl hydroxysultaine. In some embodiments including a zwitterionic surfactant, the zwitterionic surfactant includes laurylamidopropyl hydroxysultaine and/or myristylamidopropyl hydroxysultaine. In some embodiments including a nonionic surfactant, the nonionic surfactant includes one or more of an alkyl polyglycoside, an aliphatic alcohol, an ethoxylated aliphatic alcohol and an aliphatic amine oxide.

In some embodiments including an aliphatic alcohol-based component, the aliphatic alcohol-based component includes one or more C8-14-aliphatic alcohols and/or ethoxylates of C10-14-aliphatic alcohols having an average of no more than about 6 ethylene oxide units. In some embodiments, the composition also includes two or more $C_{8-14}$-aliphatic alcohols, which may be, for example, octyl alcohol and lauryl alcohol.

In some embodiments, the composition also includes a water-miscible organic solvent. In some embodiments including a water-miscible organic solvent, the solvent may be one or more of a glycol, glycol ether, glycerol, and/or water-soluble polyethylene glycol (PEG). In some embodiments including a water-miscible organic solvent, the solvent may be one or more of diethylene glycol n-butyl monoether, dipropylene glycol n-propyl monoether, hexylene glycol, ethylene glycol, dipropylene glycol, tripropylene glycol, dipropylene glycol monobutyl ether, dipropylene glycol monomethyl ether, ethylene glycol monobutyl ether, tripropylene glycol monomethyl ether, dipropylene glycol monopropyl ether, propylene glycol, glycerol, or a mixture of two or more thereof. In some embodiments including a water-miscible organic solvent, the solvent may be one or more of ethylene glycol, propylene glycol and butyl carbitol. In some embodiments, the composition also includes an alkanolamine.

In some embodiments, the aqueous firefighting foam composition includes about 5 to 25 wt. % of a sugar component, about 0.1 to 5 wt. % of an aliphatic alcohol-based nonionic surfactant, about 2 to 15 wt. % of the anionic surfactant, about 2 to 10 wt. % of the zwitterionic surfactant, about 2 to 15 wt. % of water-miscible organic solvent, about 1 to 5 wt. % polysaccharide thickener, which includes succinoglycan, and at least about 40 wt. % water. In this embodiment, the composition generally contains no more than 0.01 wt. % fluorinated surfactant and, often, is completely free of any fluorinated surfactant or other fluorinated compound. The composition may desirably be substantially free of any fluorinated compound, e.g., contain no more than 0.01 wt. % fluorinated surfactant(s) and, often, is completely free of any fluorinated surfactant or other fluorinated compound.

In another embodiment, the aqueous firefighting foam composition includes about 5 to 20 wt. % monosaccharide sugar, about 3 to 10 wt. % $C_{8-14}$-alkyl sulfate anionic surfactant, about 2 to 8 wt. % $C_{8-14}$-alkylamidopropyl hydroxysultaine, about 0.2 to 2 wt. % $C_{8-14}$-aliphatic alcohol, about 0.5 to 4 wt. % succinoglycan, about 0.2 to 1.5 wt. % xanthan gum, about 2 to 10 wt. % butyl carbitol, and at least about 40 wt. % water. In this embodiment, the composition generally contains no more than 0.01 wt. % fluorinated surfactant and, often, is completely free of any fluorinated surfactant or other fluorinated compound. The composition may desirably be substantially free of any fluorinated compound, e.g., contain no more than 0.01 wt. % fluorinated surfactant(s) and, often, is completely free of any fluorinated surfactant or other fluorinated compound.

Another illustrative embodiment provides an aqueous firefighting foam composition including a sugar component; a polysaccharide thickener which includes succinoglycan; an anionic surfactant; a nonionic surfactant; a water-miscible solvent; magnesium salt; and at least about 30% water. In some embodiments, the composition also includes a zwitterionic surfactant.

Another illustrative embodiment provides an aqueous firefighting foam composition including a sugar component; a polysaccharide thickener which includes succinoglycan; an anionic surfactant; a nonionic surfactant; a water-miscible solvent; magnesium salt; and at least about 30% water. In some embodiments, the composition also includes a zwitterionic surfactant.

Another illustrative embodiment provides an aqueous firefighting foam composition including a surfactant component including one or more of an anionic surfactant and a zwitterionic surfactant; an $C_{8-14}$-aliphatic alcohol-based component; polysaccharide thickener comprising succinoglycan; and at least about 40 wt. % water. In some embodiments, the composition also includes a water-miscible organic solvent comprising an alkylene glycol and/or alkylene glycol ether. In some embodiments, the composition also includes a nonionic surfactant. In some embodiments, the composition is free of nonionic surfactant(s).

Any of the above embodiments may optionally include other compounds to enhance performance of the composition. For example, in any of the above disclosed embodiments, the composition may include one or more of a chelator, a buffer, a corrosion inhibitor and a preservative. In any of the above embodiments, the composition may have a pH of about 7 to 9. In any of the above embodiments, the composition may be substantially free of cationic surfactants. In any of the above embodiments, the composition may be substantially free of any alkyl polyglycoside surfactant. In any of the above embodiments, the composition may be substantially free of any amine oxide surfactant. In any of the above embodiments, the composition may be substantially free of fluorinated compounds.

Another illustrative embodiment provides an aqueous firefighting foam composition including a) about 5 to 10 wt. % $C_{8-18}$-alkyl sulfate surfactant, b) about 2 to 8 wt. % $C_{8-18}$-alkylamidopropyl hydroxysultaine; c) about 0.1 to 2 wt. % $C_{8-14}$-aliphatic alcohol-based component, d) about 2 to 10 wt. % water-miscible organic solvent comprising an alkylene glycol and/or alkylene glycol ether, e) about 1 to 4 wt. % polysaccharide thickener including succinoglycan, and f) at least about 50 wt. % water. The aliphatic alcohol-based component may includes at least two alcohols and/or alcohol ethoxylates. For example, the composition may include two or more alcohol-based compounds, such as aliphatic alcohols and/or ethoxylates of aliphatic alcohols. In compositions including aliphatic alcohol ethoxylates, the ethoxylates may have an average of no more than about 6 and, or no more than about 4 ethylene oxide units, or often no more than about 2 ethylene oxide units. The composition may desirably be substantially free of any fluorinated compound, e.g., contain no more than 0.01 wt. % fluorinated surfactant(s) and, often, is completely free of any fluorinated surfactant or other fluorinated compound.

Another illustrative embodiment provides an aqueous firefighting foam composition including a) about 5 to 10 wt. % of one or more of an octyl sulfate salt, a decyl sulfate salt and a lauryl sulfate salt, b) about 2 to 8 wt. % $C_{8-18}$-alkylamidopropyl hydroxysultaine, c) about 0.1 to 2 wt. % octyl alcohol, lauryl alcohol, or a combination of octyl alcohol and lauryl alcohol, about 2 to 10 wt. % butyl carbitol, about 1 to 4 wt. % xanthan gum and succinoglycan, about 0.5 to 3 wt. % magnesium sulfate, and g) at least about 50 wt. % water. The composition may desirably be substantially free of any fluorinated compound, e.g., contain no more than 0.01 wt. % fluorinated surfactant(s) and, often, is completely free of any fluorinated surfactant or other fluorinated compound.

Another illustrative embodiment provides a method of fighting a fire, including forming a foam from a composition that includes at least one of the aqueous firefighting foam compositions previously disclosed herein, and applying the foam directly or indirectly onto the fire. Such a method may be employed to fight a class A or class B fire.

Another illustrative embodiment provides a method of forming a firefighting foam including diluting the composition of any one of the aqueous firefighting foam compositions previously disclosed herein with an aqueous diluting agent to provide a foam precursor solution, and aerating the foam precursor solution to provide the firefighting foam. The aqueous diluting agent may include one or more of municipal water, brackish water and salt water.

Para. 1. An aqueous firefighting composition comprising: a sugar component; a surfactant component comprising an anionic surfactant, a zwitterionic surfactant, optionally a nonionic surfactant, or a mixture of any two or more thereof; a polysaccharide thickener comprising succinoglycan; and at least about 30 wt. % water.

Para. 2. The aqueous firefighting composition of para. 1, wherein the firefighting composition further comprises an alkanolamine, a glycol solvent, a glycol ether solvent, an aliphatic alcohol-based component, a magnesium salt, or a mixture of any two or more thereof.

Para. 3. The aqueous firefighting composition of para. 1, wherein the sugar component comprises at least about 50 wt. % of a monosaccharide, sugar alcohol, or a mixture of any two or more thereof.

Para. 4. The aqueous firefighting composition of para. 1, wherein the polysaccharide thickener further comprises xanthan gum, diutan gum, rhamsan gum, welan gum, gellan gum, guar gum, konjac gum, tara gum, methylcellulose, or a mixture of any two or more thereof.

Para. 5. The aqueous firefighting composition of para. 1, wherein polysaccharide thickener further comprises agar, sodium alginate, carrageenan, gum arabic, gum guaicum, neem gum, pistacia lentiscus, gum chatti, caranna, galactomannan, gum tragacanth, karaya gum, guar gum, xanthan gum, welan gum, rhamsam gum, locust bean gum, beta-glucan, cellulose, methylcellulose, chicle gum, kino gum, dammar gum, glucomannan, mastic gum, spruce gum, tara gum, gellan gum, acacia gum, cassia gum, diutan gum, fenugreek gum, ghatti gum, hydroxyethylcellulose, hydroxypropylmethyl-cellulose, karaya gum, konjac gum, pectin, propylene glycol alginate, or a mixture of any two or more thereof.

Para. 6. The aqueous firefighting composition of para. 1, wherein the surfactant component comprises an anionic surfactant and a zwitterionic surfactant.

Para. 7. The aqueous firefighting composition of para. 1, wherein the surfactant component comprises an anionic surfactant and a nonionic surfactant.

Para. 8. The aqueous firefighting composition of para. 6 or 7, wherein the anionic surfactant comprises an aliphatic sulfate salt, aliphatic sulfonate salt, an aliphatic ether sulfate salt, aliphatic ether sulfate salt, or a mixture of any two or more thereof.

Para. 9. The aqueous firefighting composition of para. 6 or 7, wherein the anionic surfactant comprises a $C_{8-14}$-alkyl sulfate salt, a $C_{8-14}$-alkyl ether sulfate salt, a $C_{8-14}$-alkyl sulfonate salt, or a mixture of any two or more thereof.

Para. 10. The aqueous firefighting composition of para. 6 or 7, wherein the anionic surfactant comprises an octyl sulfate salt, a decyl sulfate salt, a dodecyl sulfate salt, a tetradecyl sulfate salt, or a mixture of any two or more thereof.

Para. 11. The aqueous firefighting composition of para. 6, wherein the zwitterionic surfactant comprises an aliphatic amidoalkyl hydroxysultaine, an aliphatic amidoalkyl betaine, an aliphatic sulfobetaine surfactant, an aliphatic betaine surfactant, or a mixture of any two or more thereof.

Para. 12. The aqueous firefighting composition of para. 6, wherein the zwitterionic surfactant comprises a $C_{8-14}$-alkylamidopropyl hydroxysultaine.

Para. 13. The aqueous firefighting composition of para. 6, wherein the zwitterionic surfactant comprises cocamidopropyl hydroxysultaine.

Para. 14. The aqueous firefighting composition of para. 6, wherein the zwitterionic surfactant comprises laurylamidopropyl hydroxysultaine, myristylamidopropyl hydroxysultaine, or a mixture thereof.

Para. 15. The aqueous firefighting composition of para. 7, wherein the nonionic surfactant comprises an alkyl polyglycoside, an aliphatic alcohol, an ethoxylated aliphatic alcohol, an aliphatic amine oxide, or a mixture of any two or more thereof.

Para. 16. The aqueous firefighting composition of para. 2, wherein the aliphatic alcohol-based component comprises $C_{8-14}$-aliphatic alcohols, ethoxylates of $C_{10-14}$-aliphatic alcohols having an average of no more than about 6 ethylene oxide units, or a mixture of any two or more thereof.

Para. 17. The aqueous firefighting composition of any one of paras. 1 to 15, wherein the composition further comprises two or more $C_{8-14}$-aliphatic alcohols.

Para. 18. The aqueous firefighting composition of para. 17, wherein the composition comprises octyl alcohol and lauryl alcohol.

Para. 19. The aqueous firefighting composition of any one of paras. 1 to 18, wherein the composition further comprises a water-miscible organic solvent.

Para. 20. The aqueous firefighting composition of para. 19, wherein the water-miscible organic solvent comprises a glycol, glycol ether, glycerol, and/or water-soluble polyethylene glycol (PEG), or a mixture of any two or more thereof.

Para. 21. The aqueous firefighting composition of para. 19, wherein the water-miscible organic solvent comprises diethylene glycol n-butyl monoether, dipropylene glycol n-propyl monoether, hexylene glycol, ethylene glycol, dipropylene glycol, tripropylene glycol, dipropylene glycol monobutyl ether, dipropylene glycol monomethyl ether, ethylene glycol monobutyl ether, tripropylene glycol monomethyl ether, dipropylene glycol monopropyl ether, propylene glycol, glycerol, or a mixture of two or more thereof.

Para. 22. The aqueous firefighting composition of para. 19, wherein the water-miscible organic solvent comprises ethylene glycol, propylene glycol, butyl carbitol, or a mixture of any two or more thereof.

Para. 23. The aqueous firefighting composition of para. 1, wherein the composition comprises: a $C_{8-14}$-alkyl sulfate surfactant; a $C_{8-14}$-alkylamidopropyl hydroxysultaine surfactant; a water-miscible organic solvent comprising diethylene glycol n-butyl ether; a polysaccharide thickener comprising xanthan gum; and the sugar component comprises at least about 85 wt. % fructose, glucose, or a mixture thereof.

Para. 24. The aqueous firefighting composition of any one of paras. 1 to 23, wherein the composition further comprises an alkanolamine.

Para. 25. The aqueous firefighting composition of any one of paras. 1 to 24, wherein the composition further comprises a divalent metal salt.

Para. 26. The aqueous firefighting composition of para. 25, wherein the divalent metal salt comprising a magnesium salt.

Para. 27. The aqueous firefighting composition of para. 26, wherein the magnesium salt comprises magnesium sulfate, magnesium acetate, or a mixture thereof.

Para. 28. The aqueous firefighting composition of any of paras. 1 to 27 further comprising a reducing agent.

Para. 29. The aqueous firefighting composition of para. 28, wherein the reducing agent comprises a sulfite salt.

Para. 30. The aqueous firefighting composition of para. 28 or 29, wherein the reducing agent comprises sodium sulfite, sodium metabisulfite, sodium bisulfite, or a mixture of any two or more thereof.

Para. 31. The aqueous fire-fighting foam concentrate of any one of paras. 1 to 30 further comprising a microfibrous cellulose.

Para. 32. The aqueous fire-fighting foam concentrate of para. 31, wherein the microfibrous cellulose includes a fermentation derived cellulose.

Para. 33. The aqueous fire-fighting foam concentrate of para. 31 or 32, wherein the microfibrous cellulose is derived from a microbial fermentation process.

Para. 34. The aqueous fire-fighting foam concentrate of any one of paras. 31-33, wherein the microfibrous cellulose includes cellulose derived from a bacterial fermentation process.

Para. 35. The aqueous fire-fighting foam concentrate of any one of paras. 31-34, wherein the microfibrous cellulose has an average fiber diameter of no more than about 10 μm. This may include no more than about 1 μm, or in some embodiments, from about 50 to 300 nm.

Para. 36. The aqueous fire-fighting foam concentrate of any one of paras. 31-35, wherein prior to incorporation into the composition the microfibrous cellulose is activated by combining a powdered microfibrous cellulose and optionally co-agent with water and mixing with high shear.

Para. 37. The aqueous fire-fighting foam concentrate of any one of paras. 31-36, which includes about 0.1 to 5 wt. %, or about 0.5 to 3 wt. %, of a suspension agent.

Para. 38. An aqueous firefighting composition comprising: a sugar component;

- polysaccharide thickener comprising succinoglycan; anionic surfactant, optionally a nonionic surfactant; water-miscible organic solvent; magnesium salt; and at least about 30 wt. % water.

Para. 39. The aqueous firefighting composition of para. 38, further comprising a zwitterionic surfactant.

Para. 40. The aqueous firefighting composition of para. 38, comprising: about 5 to 25 wt. % of the sugar component; about 0.1 to 5 wt. % of an aliphatic alcohol-based nonionic surfactant; about 2 to 15 wt. % of the anionic surfactant; about 2 to 10 wt. % of the zwitterionic surfactant; about 2 to 15 wt. % of water-miscible organic solvent; about 1 to 5 wt. % polysaccharide thickener comprising succinoglycan; and at least about 40 wt. % water; and wherein the composition contains no more than 0.01 wt. % fluorinated surfactants.

Para. 41. The aqueous firefighting composition of para. 38, comprising: about 5 to 20 wt. % monosaccharide sugar; about 3 to 10 wt. % $C_{8-14}$-alkyl sulfate anionic surfactant; about 2 to 8 wt. % $C_{8-14}$-alkylamidopropyl hydroxysultaine; about 0.2 to 2 wt. % $C_{8-14}$-aliphatic alcohol; about 0.5 to 4 wt. % succinoglycan; about 0.2 to 1.5 wt. % xanthan gum; about 2 to 10 wt. % butyl carbitol; and at least about 40 wt. % water; and wherein the composition contains no more than 0.01 wt. % fluorinated surfactants.

Para. 42. An aqueous firefighting composition comprising: a surfactant component comprising an anionic surfactant, a zwitterionic surfactant, or a mixture of any two or more thereof; an $C_{8-14}$-aliphatic alcohol-based component; a polysaccharide thickener comprising succinoglycan; and at least about 40 wt. % water.

Para. 43. The aqueous firefighting composition of para. 42, wherein the composition further comprises a water-miscible organic solvent comprising an alkylene glycol, an alkylene glycol ether.

Para. 44. The aqueous firefighting composition of para. 42 or 43, wherein the composition further comprises a nonionic surfactant.

Para. 45. The aqueous firefighting composition of any one of paras. 1 to 44 further comprising a chelator, a buffer, a corrosion inhibitor, a preservative, or a mixture of any two or more thereof.

Para. 46. The aqueous firefighting composition of any one of paras. 1 to 45, wherein the composition has a pH of about 7 to 9.

Para. 47. The aqueous firefighting composition of any one of paras. 1 to 46, wherein the composition is substantially free of any cationic surfactant.

Para. 48. The aqueous firefighting composition of any one of paras. 1 to 47, wherein the composition is substantially free of any alkyl polyglycoside surfactant.

Para. 49. The aqueous firefighting composition of any one of paras. 1 to 48, wherein the composition is substantially free of any amine oxide surfactant.

Para. 50. The aqueous firefighting composition of any one of paras. 1 to 49, wherein the composition is substantially free of fluorinated compounds.

Para. 51. The aqueous firefighting composition of any one of paras. 1-6, 8-14, 16-39, 41-43, and 45-50, wherein the composition is free of nonionic surfactants.

Para. 52. An aqueous firefighting composition comprising: about 5 to 10 wt. % $C_{8-18}$-alkyl sulfate surfactant; about 2 to 8 wt. % $C_{8-18}$-alkylamidopropyl hydroxysultaine; about 0.1 to 2 wt. % $C_{8-14}$-aliphatic alcohol-based component; about 2 to 10 wt. % water-miscible organic solvent comprising an alkylene glycol and/or alkylene glycol ether; about 1 to 4 wt. % polysaccharide thickener comprising succinoglycan; and at least about 50 wt. % water; and wherein the composition contains no more than 0.01 wt. % fluorinated compounds.

Para. 53. An aqueous firefighting composition comprising: about 5 to 10 wt. % of one or more of an octyl sulfate salt, a decyl sulfate salt and a lauryl sulfate salt; about 2 to 8 wt. % $C_{8-18}$-alkylamidopropyl hydroxysultaine; about 0.1 to 2 wt. % octyl alcohol and/or lauryl alcohol; about 2 to 10 wt. % butyl carbitol; about 1 to 4 wt. % xanthan gum and succinoglycan; about 0.5 to 3 wt. % magnesium sulfate; and at least about 50 wt. % water; wherein the composition contains no more than 0.01 wt. % fluorinated compounds.

Para. 54. A method of fighting a fire, the method comprising forming a foam comprising the aqueous firefighting composition of any one of paras. 1 to 53, and applying the foam directly or indirectly onto the fire.

Para. 55. The method of para. 54, wherein the fire is a class B fire.

Para. 56. A method of forming a firefighting foam, the method comprising diluting the aqueous firefighting composition of any one of paras. 1 to 53 with an aqueous diluting agent to provide a foam precursor solution; and aerating the foam precursor solution to provide the firefighting foam.

Para. 57. The method of para. 56, wherein the aqueous diluting agent comprises municipal water, brackish water, salt water, or a mixture of any two or more thereof.

Para. 58. The method of para. 56, wherein the aqueous diluting agent comprises municipal water, brackish water, salt water, or a mixture of any two or more thereof.

While certain embodiments have been illustrated and described, it should be understood that changes and modifications can be made therein in accordance with ordinary skill in the art without departing from the technology in its broader aspects.

The embodiments illustratively described herein may suitably be practiced in the absence of any element or elements, limitation or limitations, not specifically disclosed herein. Thus, for example, the terms "comprising," "including," "containing," shall be read expansively and without limitation. Additionally, the terms and expressions employed herein have been used as terms of description and not of limitation, and there is no intention in the use of such terms and expression of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "and" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or illustrative language (e.g., "such as") provided herein, is intended merely to better illuminate the embodiments and does not pose a limitation on the scope of the claims unless otherwise stated. No language in the specification should be construed as indicating any non-claimed element as essential.

Additionally, where features or aspects of the disclosure are described in terms of Markush groups, those skilled in the art will realize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof

What is claimed is:

1. A firefighting foam concentrate comprising:

a sugar component comprising at least about 50 wt. % of a monosaccharide, sugar alcohol, or a mixture of any two or more thereof;

a surfactant component comprising an anionic surfactant and a zwitterionic surfactant;

a polysaccharide thickener comprising succinoglycan;

a suspension agent comprising microfibrous cellulose; and wherein the firefighting foam concentrate is substantially free of non-ionic surfactants.

2. The firefighting foam concentrate of claim 1, wherein greater than 50 wt. % of the microfibrous cellulose is dispersed in the firefighting foam concentrate and not solubilized.

3. The firefighting foam concentrate of claim 1, wherein the microfibrous cellulose is derived from microbial fermentation.

4. The firefighting foam concentrate of claim 1, wherein the suspension agent comprises microfibrous cellulose, xanthan gum, and carboxymethyl cellulose in a ratio of about 6:3:1, or a mixture of microfibrous cellulose, guar gum, and carboxymethyl cellulose in a ratio of about 3:1:1.

5. The firefighting foam concentrate of claim 1 further comprising an alkanolamine, a glycol solvent, a glycol ether solvent, an aliphatic alcohol-based component, a magnesium salt, or a mixture of any two or more thereof.

6. The firefighting foam concentrate of claim 1, wherein the polysaccharide thickener further comprises xanthan gum, diutan gum, rhamsan gum, welan gum, gellan gum, guar gum, konjac gum, tara gum, methylcellulose, or a mixture of any two or more thereof.

7. The firefighting foam concentrate of claim 1, wherein the polysaccharide thickener further comprises agar, sodium alginate, carrageenan, gum arabic, gum guaicum, neem gum, pistacia lentiscus, gum chatti, caranna, galactomannan, gum tragacanth, karaya gum, guar gum, xanthan gum, welan gum, rhamsam gum, locust bean gum, beta-glucan, cellulose, methylcellulose, chicle gum, kino gum, dammar gum, glucomannan, mastic gum, spruce gum, tara gum, gellan gum, acacia gum, cassia gum, diutan gum, fenugreek gum, ghatti gum, hydroxyethylcellulose, hydroxypropylmethylcellulose, karaya gum, konjac gum, pectin, propylene glycol alginate, or a mixture of any two or more thereof.

8. The firefighting foam concentrate of claim 1, wherein the anionic surfactant comprises an aliphatic sulfate salt, aliphatic sulfonate salt, an aliphatic ether sulfate salt, or a mixture of any two or more thereof.

9. The firefighting foam concentrate of claim 1, wherein the anionic surfactant comprises a $C_{8-14}$-alkyl sulfate salt, a $C_{8-14}$-alkyl ether sulfate salt, a $C_{8-14}$-alkyl sulfonate salt, or a mixture of any two or more thereof.

10. The firefighting foam concentrate of claim 1, wherein the anionic surfactant comprises an octyl sulfate salt, a decyl sulfate salt, a dodecyl sulfate salt, a tetradecyl sulfate salt, or a mixture of any two or more thereof.

11. The firefighting foam concentrate of claim 1, wherein the zwitterionic surfactant comprises an aliphatic amidoalkyl hydroxysultaine, an aliphatic amidoalkyl betaine, an aliphatic sulfobetaine surfactant, an aliphatic betaine surfactant, or a mixture of any two or more thereof.

12. The firefighting foam concentrate of claim 1, wherein the zwitterionic surfactant comprises a $C_{8-14}$-alkylamidopropyl hydroxysultaine, cocamidopropyl hydroxysultaine, laurylamidopropyl hydroxysultaine, myristylamidopropyl hydroxysultaine, or a mixture thereof.

13. The firefighting foam concentrate of claim 1 further comprising a water-miscible organic solvent that is propylene glycol, glycerol, or a mixture thereof.

14. The firefighting foam concentrate of claim 1 comprising:

a $C_{8-14}$-alkyl sulfate surfactant;

a $C_{8-14}$-alkylamidopropyl hydroxysultaine surfactant;

the polysaccharide thickener further comprising xanthan gum;

the suspension agent comprising microfibrous cellulose; and the sugar component comprises at least about 85 wt. % fructose, glucose, or a mixture thereof.

15. The firefighting foam concentrate of claim 1 further comprising a biocide, a corrosion inhibitor, a reducing agent, or a mixture of any two or more thereof.

16. A method of making a firefighting foam concentrate, the method comprising:

forming a suspension agent by blending microfibrous cellulose with a solvent at sufficient shear to disperse fibers of the microfibrous cellulose in the solvent;

blending the suspension agent with:

a sugar component comprising at least about 50 wt. % of a monosaccharide, sugar alcohol, or a mixture of any two or more thereof;

a surfactant component comprising an anionic surfactant and a zwitterionic surfactant; and a polysaccharide thickener comprising succinoglycan; and wherein the firefighting foam concentrate is substantially free of non-ionic surfactants.

17. A method of fighting a fire comprising:

aerating a firefighting foam composition to form an aerated firefighting foam;

administering the aerated firefighting foam to a fire or applying the aerated firefighting foam to a surface of a volatile flammable liquid;

wherein:

the firefighting foam composition comprises:

a sugar component;

a surfactant component comprising an anionic surfactant and a zwitterionic surfactant;

a polysaccharide thickener comprising succinoglycan;

a suspension agent comprising microfibrous cellulose; and at least about 30 wt. % water; and wherein the firefighting foam composition is substantially free of non-ionic surfactants.

* * * * *